United States Patent [19]

Bullard et al.

[11] 3,886,814

[45] June 3, 1975

[54] COOLING CIRCUIT FOR A VEHICLE TRANSMISSION

[75] Inventors: David E. Bullard, Washington; Jan K. Allen, Chillicothe, both of Ill.

[73] Assignee: Caterpillar Tractor Co., Peoria, Ill.

[22] Filed: Aug. 14, 1973

[21] Appl. No.: 388,189

[52] U.S. Cl. .................. 74/730; 60/337; 74/732; 74/733
[51] Int. Cl. .................. F16h 47/08; F16d 33/00
[58] Field of Search ......... 74/730, 732, 733; 60/337

[56] References Cited
UNITED STATES PATENTS

| | | | |
|---|---|---|---|
| 2,889,718 | 6/1959 | Schjolin et al. ................. | 74/732 |
| 3,293,944 | 12/1966 | Hilpert ................................ | 74/732 |
| 3,566,999 | 3/1971 | Robinson ........................... | 74/732 X |
| 3,591,966 | 7/1971 | Kell ..................................... | 60/337 |
| 3,635,026 | 1/1972 | Hahn et al. ....................... | 60/337 |

*Primary Examiner*—Samuel Scott
*Assistant Examiner*—John Reep
*Attorney, Agent, or Firm*—Phillips, Moore, Weissenberger, Lempio & Strabala

[57] ABSTRACT

A multi-speed transmission includes working fluid, and is normally cooled by circulation of the working fluid through a heat exchanger due to rotation of a torque converter which is part of the transmission. In the engagement of those speeds wherein the torque converter does not rotate, appropriate valve means actuate to bring an alternate transmission cooling system into play, circulating fluid through the heat exchanger. The alternate cooling system is automatically cut off upon engagement and rotation of the torque converter.

7 Claims, 1 Drawing Figure

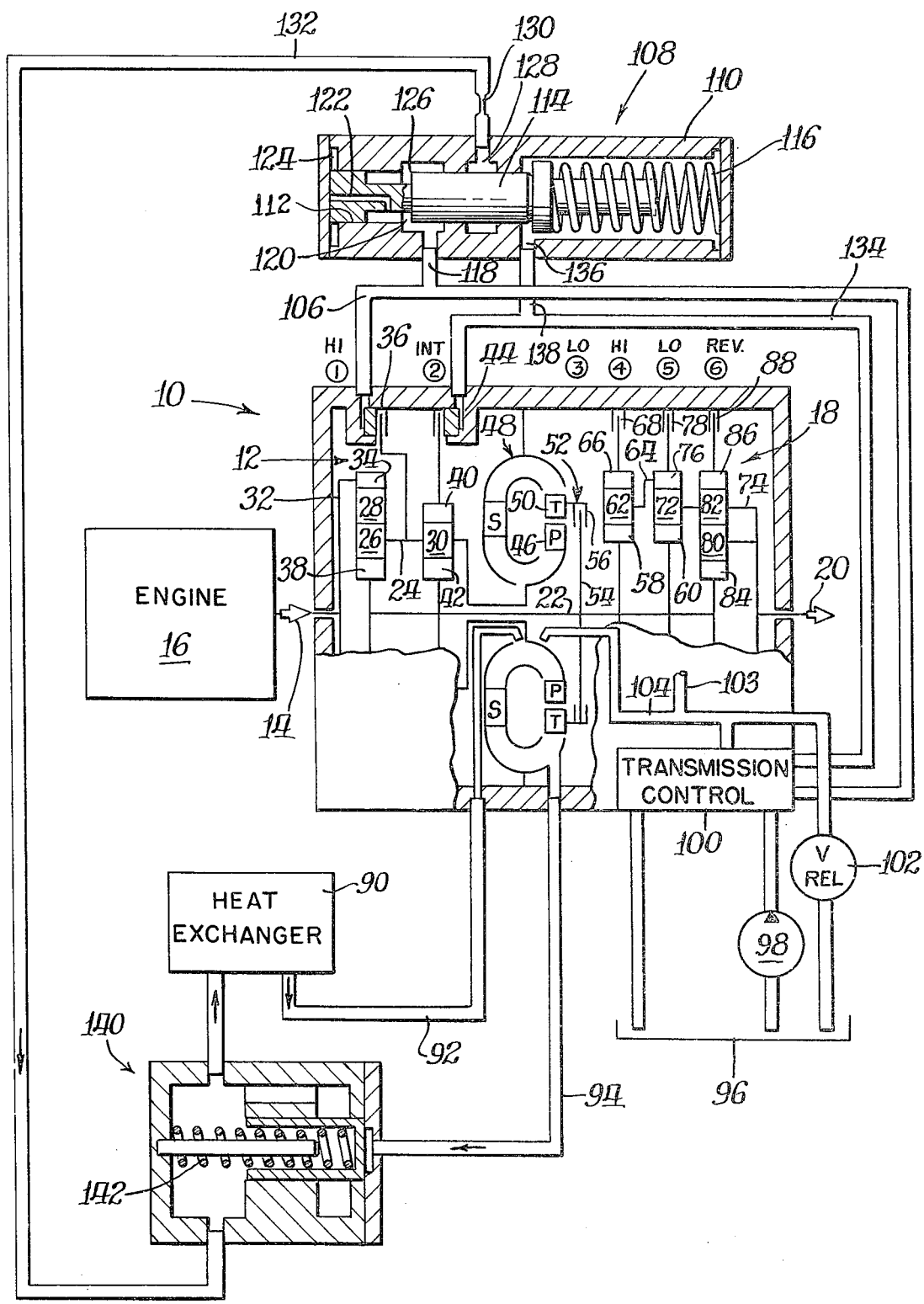

COOLING CIRCUIT FOR A VEHICLE TRANSMISSION

The invention herein described was made in the course of or under a contract or subcontract thereunder, with the Department of the Army.

BACKGROUND OF THE INVENTION

This invention relates to cooling systems for a vehicle drive transmission, and more particularly, to such a cooling system which provides proper cooling of the transmission in any engaged speed thereof.

U.S. Pat. No. 3,115,789 to Chambers el at. (assigned to the assignee of this application) discloses a vehicle transmission having a torque converter and providing six forward and one reverse speed, each selectable by actuation of a combination of five stationary brakes and one rotating clutch.

It will be understood that it is extremely important to avoid overheating of the transmission, which may result in damage thereto. A transmission cooling system designed for such purpose must, of course, be capable of providing proper cooling in any of the engaged speeds, and must not interfere with the proper operation and use of the transmission itself. That is, there must be little or no loss of efficiency of the transmission itself due to the cooling system thereof. In addition, the cooling system should be simple in design and operation.

SUMMARY OF THE INVENTION

It is an object of this invention to provide a cooling circuit for a vehicle multi-speed transmission which is capable of preventing overheating of the transmission in any of the selected transmission speeds.

It is a further object of this invention to provide a cooling system for a vehicle multi-speed transmission which, while being effective in such cooling operation, allows the transmission to be utilized and operated with maximum efficiency.

It is a still further object of this invention to provide a cooling system for a vehicle transmission which, while fulfilling the above objects, is simple in design and operation.

Broadly stated, the invention is in a transmission including working fluid and a torque converter rotatable at relatively higher and lower speeds. Such invention comprises a heat exchanger, and first means communicating the working fluid with the heat exchanger so that rotation of the torque converter causes flow of the working fluid from the transmission, through the heat exchanger, and back to the transmission, a higher rate of rotation of the torque converter increasing such flow. Further included are fluid pressure means, and second means communicating the working fluid with the heat exchanger so that the fluid pressure means cause flow of the working fluid from the transmission, through the heat exchanger, and back to the transmission only upon the rate of rotation of the torque converter falling below a chosen level.

BRIEF DESCRIPTION OF THE DRAWING

These and other objects of the invention will become apparent from a study of the following specification and drawing, which is a schematic side elevation of the transmission, showing the cooling system thereof.

DESCRIPTION OF THE PREFERRED EMBODIMENT

Referring now to the drawing, the transmission 10 has an input section 12 which receives power indicated by arrow 14 from an engine 16 and an output section 18 which delivers power indicated by arrow 20 to a driven mechanism (not shown). Input section 12 and output section 18 are mechanically coupled by means of a common shaft 22 which lies along the axis of the transmission 10. In the input section 12, a carrier 24 supports a first planetary system formed by planets 26, 28 which mesh with each other, and a second planetary system formed by planets 30. Incoming power 14 drives engine flywheel 32, to which is attached a ring gear 34. Ring gear 34 rotates the planets of the first planetary system through engagement with planets 28. Carrier 24 can be held stationary by a first brake 36 which is integral with carrier 24. Planets 26 mesh with a sun gear 38 causing rotation thereof in the same direction as flywheel 32, and directing power to shaft 22 on which sun gear 38 is mounted. Planets 30 mesh with rotatable ring gear 40 and sun gear 42 mounted on shaft 22. Ring gear 40 can also be prevented from rotation through the action of a second brake 44 which is integral with ring gear 40, providing a reaction member for planets 30. Also connected to carrier 24 is the impeller 46 of a three-member, single stage torque converter 48 of the stationary housing type. Rotation of impeller 46 induces rotation of torque converter turbine 50 in a conventional manner.

Connected to turbine 50 is a rotating clutch assembly 52. Rotating clutch 52 includes disc 54 which is integrally mounted on shaft 22. The connection between member 56 and disc 54 is such that, when disengaged, clutch 52 allows rotation of disc 54 without the rotation being transmitted to member 56, and when engaged, member 56 is locked to disc 54, allowing the rotation of turbine 50 to be transmitted to member 56, clutch 52 and disc 54 to shaft 22.

By the engagement of either brake 36, brake 44 or clutch 52, one of three possible drive conditions is selected for transmitting power through shaft 22 to the output section 18 of the transmission 10. Activation of the brake 36 will stop rotation of carrier 24 and thereby produce the highest speed operation of the input portion 12 of the transmission 10. Brake 44, which produces an overdrive condition similar to that produced by brake 36, holds ring gear 40 stationary to obtain a slightly lower overdrive condition in the input section 12 of the transmission 10. For low-range, high torque condition, the torque converter 48 is linked into the system by engagement of rotating clutch 52.

Rotation of shaft 22 drives output sun gears 58,60 mounted thereon and located in the output section 18 of the transmission 10. Sun gear 58 drives a first output planetary system formed by output planets 62 which are mounted on a carrier 64 and in engagement with reaction ring gear 66. When activated, a third brake 68 splined to ring gear 66 locks the ring gear 66 against rotation. Sun gear 60 drives a second output planetary system formed by output planets 72 which are mounted on a rotatable carrier 74 and are in engagement with a second reaction ring gear 76. The two output planetary systems are connected by ring gear 76, and carrier 64. The rotation of ring gear 76 can be prevented by a fourth brake 78.

Also mounted on carrier 74 is a reversing planetary system formed by planets 80 and 82 which mesh with and are driven by a sun gear 84 mounted on shaft 22. Planets 82 engage a ring gear 86, the rotation of which is controlled by a brake 88. From carrier 74, output power is transmitted through arrow 20 to a vehicle-powered train and wheels (not shown).

The input section 12 of the transmission 10 is capable of rotating shaft 22 at one of three speeds depending upon which of brakes 36,44 or clutch 52 is actuated. The speed selected on the output section is operated in a range determined by which of brakes 68 or 78 are actuated, to select the two possible reduction gearings of the output section 18. Therefore, the transmission 10 has six different forward gear arrangements. Brake 88 is activated simultaneously with clutch 52 when reverse is desired.

The engagement of each speed is determined as follows:

| Speed | Engagement |
| --- | --- |
| First Forward Speed | Engage Clutch 52 and Brake 78 |
| Second Forward Speed | Engage Clutch 52 and Brake 68 |
| Third Forward Speed | Engage Clutch 44 and Brake 78 |
| Fourth Forward Speed | Engage Brake 36 and Brake 78 |
| Fifth Forward Speed | Engage Brake 44 and Brake 68 |
| Sixth Forward Speed | Engage Brake 36 and Brake 68 |
| Neutral Speed | Engage Brake 78 |
| First Reverse Speed | Engage Clutch 52 and Brake 88 |

The working fluid associated with the transmission 10 communicates with a heat exchanger 90 through lines 92,94, so that cooling flow of the fluid is induced by rotation of the torque converter 48, i.e., is induced by the pressure differential generated by the converter rotating wheels. It will be understood that the rate of flow of such fluid through the heat exchanger 90 increases with an increased rate of rotation of the torque converter 48, and the rate of flow is reduced upon a decreased rate of rotation of the torque converter 48.

It will be seen that in the fourth and sixth speeds, the rotating clutch 52 is disengaged and the impeller 46 is held stationary by brake 36, so that cooling flow in the converter 48 is low, because the pumping action in the converter 48 is due only to drag of the disengaged clutch 52, driving the turbine at some very low speed (i.e., the torque converter 48 is in a substantially non-rotated state). Thus, substantially no cooling fluid flow through this system occurs.

Working fluid under pressure for actuating all the brakes and clutch is delivered from a sump 96 by a pump 98 driven by the engine 16. Fluid from pump 98 flows through a transmission control 100 and through an inlet passage in the transmission 10 and is schematically shown to charge the inlet of the torque converter 48 at a maximum pressure which is controlled by a pressure relief valve 102. Lubricating fluid is directed to the transmission by a branch conduit 103.

In order to provide cooling in the fourth and sixth transmission speeds (with the rate of rotation of a torque converter 48 at a low level), fluid is bled from the line 106, which supplies fluid pressure to brake 36, to a flow control valve 108. To assure that engagement of the brake 36 is not affected by such bleeding, such bleeding is delayed until after the brake 36 is fully pressurized, so that full locking at maximum torque will be maintained. For this purpose, valve 108 includes a housing 110 defining a bore 112, and a spool 114 reciprocable within the bore 112. A helical spring 116 is included within the housing 110 to bias the spool 114 to the position shown in the drawing.

In operation, after full pressure on brake 36 is attained, fluid from the passage 118 fills a chamber 120 and through a restrictive orifice 122 fills a chamber 124 to move spool 114 rightwardly against the force of spring 116 until an edge 126 opens to an annulus 128 in housing 110 to allow flow to orifice 130. Flow is now permitted to line 132, heat exchanger 90, and the line 92. This occurs, of course, only with the torque converter 48 in its substantially non-rotative or low-speed, condition, as explained above, due to the selection of either or fourth or sixth speeds.

Fluid pressure to the brake 44 from a line 134 is routed to a chamber 136 by a branch line 138 to help reset spool 114 (along with spring 116) when pressure in the brake 36 is released when either an up or down shift is made from fourth or sixth speed. The spool 114 then blocks flow in either direction through the orifice 130.

A check valve 140 is added to the circuit system to prevent oil supplied by the flow control valve 108 from being diverted to the converter cooling circuit outlet passage 94. A low rate spring 142 permits the valve 140 to open and pass fluid from passage 94 to heat exchanger 90 when the impeller 46 is turning, without unduly restricting the flow. Thus, in other than fourth and sixth speeds, fluid is cooled through the circuit of the converter 48, passage 94, check valve 140, heat exchanger 90, and the passage 92, while only a minimum of make-up fluid enters by way of the passage 104.

On the other hand, in fourth and sixth speeds, the passage 94 is blocked because pressure in passage 132 holds the valve 140 closed with the help of the spring 142. But the flow of cool fluid from the passage 132 and heat exchanger 90 enters at passage 92 and is relieved outwardly to either the lube line passage or relieved to the sump 96 over the relief valve 102.

What is claimed is:

1. In combination with a transmission including working fluid and a torque converter, rotatable at relatively higher and lower speeds:

a heat exchanger;

first means communicating the working fluid with the heat exchanger so that rotation of the torque converter causes flow of the working fluid from the transmission to the heat exchanger through the first communicating means, through the heat exchanger, and back to the transmission, a higher rate of rotation of the torque converter increasing such flow;

fluid pressure means; and second means communicating the working fluid with the heat exchanger so that the fluid pressure means cause flow of the working fluid from the transmission to the heat exchanger through the second communicating means, through the heat exchanger, back to the transmission only upon the rate of rotation of the torque converter falling below a chosen level, wherein the second communicating means comprise valve means actuatable to provide such communication through the second communicating means only upon the rate of rotation of the torque converter falling below the chosen level to allow said fluid pressure means to cause flow of the working fluid from the transmission to the heat exchanger through the second communicating means, through the heat exchanger, and back to the transmission.

2. The apparatus of claim 1 wherein the valve means are actuatable to cut off the fluid flow caused by the fluid pressure means from the transmission to the heat exchanger through the second communicating means, through the heat exchanger, and back to the transmission upon the rate of rotation of the torque converter rising above said chosen level.

3. In combination with a transmission including working fluid and a torque converter rotatable during engagement of a first transmission speed condition, and substantially non-rotatable during engagement of a second transmission speed condition:

a heat exchanger;
first means communicating the working fluid with the heat exchanger so that rotation of a torque converter determined by engagement of said first speed condition causes flow of the working fluid from the transmission to the heat exchanger through the first communicating means, through the heat exchanger and back to the transmission, and non-rotation thereof determined by engagement of said second speed condition causes substantially no flow of the working fluid from the transmission to the heat exchanger through the first communicating means, through the heat exchanger and back to the transmission;
a fluid pump; and
second means communicating the working fluid with the heat exchanger so that the pump causes flow of the fluid from the transmission to the heat exchanger through the second communicating means, through the heat exchanger and back to the transmission only when the torque converter is in said substantially non-rotating state determined by the engagement of said second speed condition, wherein the second communicating means comprise valve means responsive to engagement of said second speed condition to allow said pump to cause flow of the working fluid from the transmission to the heat exchanger through the second communicating means, through the heat exchanger and back to the transmission.

4. The apparatus of claim 3 and further comprising first and second means for supplying fluid pressure for selective engagement of the first and second transmission speed conditions respectively, and means for providing that the valve means are responsive to build-up of fluid pressure from said second supplying means for applying such fluid to select engagement of the second transmission speed condition, to allow said pump to cause flow of the working fluid from the transmission to the heat exchanger through the second communicating means, through the heat exchanger and back to the transmission.

5. The apparatus of claim 4 wherein the valve means are responsive to build-up of fluid pressure from said first supplying means to apply said fluid pressure to select engagement of the first transmission speed condition, to cut off the fluid flow caused by the pump from the transmission to the heat exchanger through the second communicating means, through the heat exchanger and back to the transmission.

6. The apparatus of claim 5 wherein said valve means comprise a housing defining a bore, a spool reciprocable within said bore, and means resiliently biasing the spool into one position blocking fluid flow caused by the pump from the transmission to the heat exchanger through the second communicating means, through the heat exchanger, and back to the transmission, the valve spool being movable against the resiliency of said biasing means to another position under fluid pressure build-up to select engagement of the second transmission speed condition, the spool being movable into said one position under the resiliency of the biasing means and the fluid pressure build-up to select engagement of the first transmission speed condition.

7. The apparatus of claim 6 wherein the biasing means comprise a helical spring.

* * * * *